United States Patent

Hanson

[11] 4,060,709
[45] Nov. 29, 1977

[54] POWER SUPPLY CONTROL

[76] Inventor: Charles G. Hanson, 10915 Beechwood Drive, Indianapolis, Ind. 46280

[21] Appl. No.: 681,125

[22] Filed: Apr. 28, 1976

[51] Int. Cl.² .............................................. B23K 9/10
[52] U.S. Cl. .................................. 219/131 R; 307/52; 307/62; 307/86; 364/293
[58] Field of Search ...................... 235/151.21; 307/29, 307/38, 39, 52, 57, 62, 85, 86; 219/131 R, 135

[56] References Cited
U.S. PATENT DOCUMENTS

| 3,271,580 | 9/1966 | Pope | 235/151.21 |
| 3,296,452 | 1/1967 | Williams | 235/151.21 |
| 3,659,114 | 4/1972 | Polenz et al. | 307/57 |
| 3,714,453 | 1/1973 | Delisle et al. | 307/39 |
| 3,872,286 | 3/1975 | Putman | 235/151.21 |

Primary Examiner—Felix D. Gruber

Attorney, Agent, or Firm—Jenkins, Coffey & Hyland

[57] ABSTRACT

The supply of power to cyclical, separately controllable loads is controlled without interrupting the operating cycle of the loads. A controllable power supply switch interrupts the power supply circuit to the load only when signalled by a load cycle switch. A power demand monitor and limiter senses the total power being consumed by all of the loads, and generates signals indicating that the supply of power to one or more of the loads is to be interrupted when the total power consumed approaches a given maximum. A load cycle switch generates a signal when an operating cycle of a load is completed. A load gate allows the power demand monitor and limiter to pass a control signal to the power supply switch to cause it to interrupt the power supply circuit to the selected load, only after the load gate has received a signal from the load cycle switch indicating the completion of an operating cycle.

10 Claims, 9 Drawing Figures

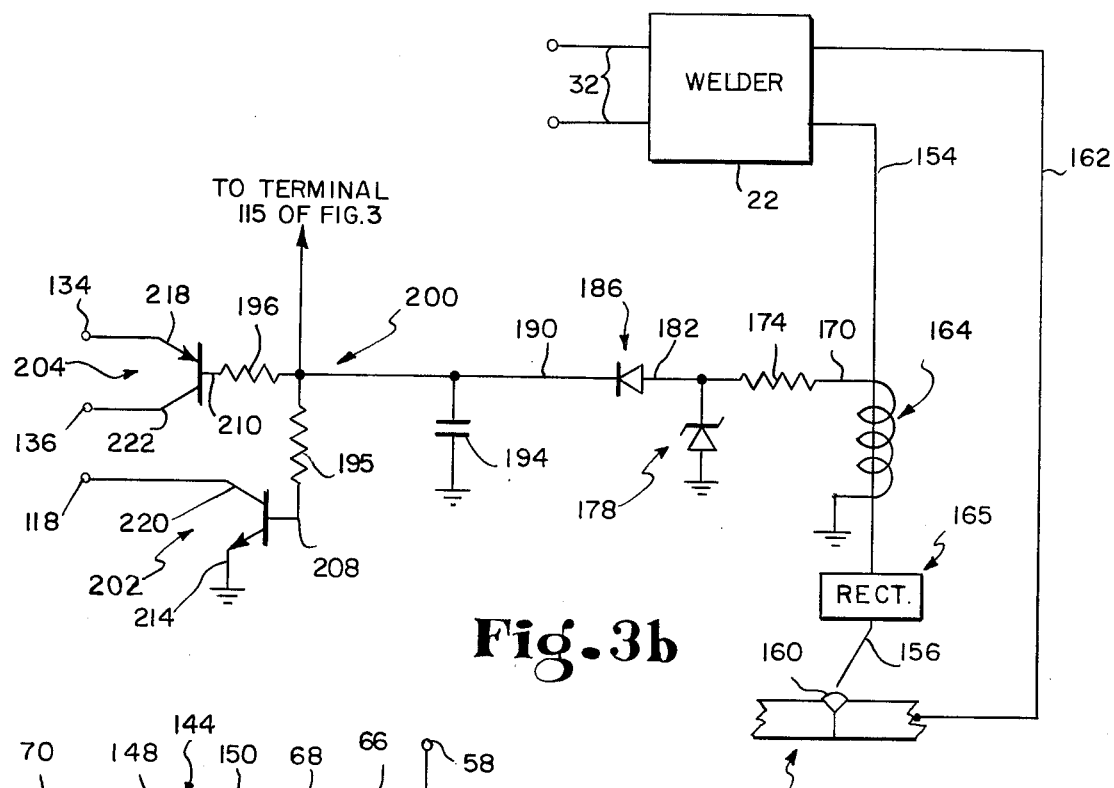
Fig. 3b
Fig. 3a
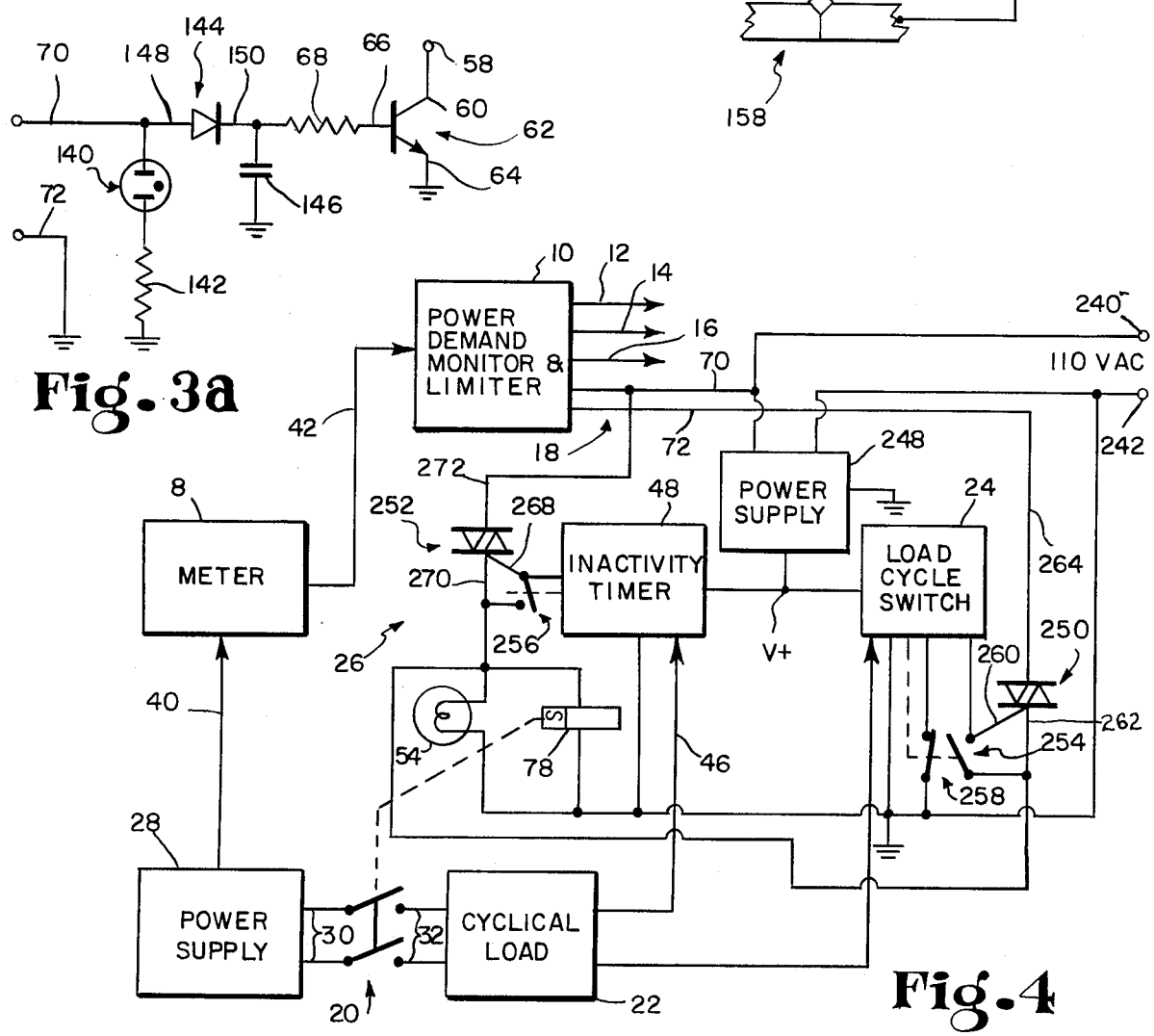
Fig. 4

POWER SUPPLY CONTROL

This invention is useful with apparatus which regulates and controls the connection of a plurality of loads to a power supply. Such regulation and control apparatus is generally referred to as power demand monitoring and limiting apparatus, and is used to maintain within acceptable limits the amount of power consumed by the said plurality of loads. Maintenance of the consumed power within limits favorably effects the power consumer's utility billing rate.

In the electrical industry, charges for power are frequently based, at least in part, on the maximum demand for power during a given billing period. To determine such charges, a maximum demand meter is frequently employed to indicate the maximum power consumption by a load or a number of loads operated by a power consumer during a demand interval. The demand interval may be, for example, a fifteen minute interval which occurs during the power consumer's billing period, for example, the month.

In order to maintain the utility's demand charge at a reasonable level, it is desirable to maintain the power consumed by the load or plurality of loads within a predetermined maximum. Of course, it is also desirable to continue without interruption the supply of power to as many of such loads as possible without exceeding the maximum desirable power consumption. Several devices for achieving this end are well known. See, for example, U.S. Pat. Nos. 3,296,452 issued Jan. 3, 1967 to W. L. Williams, and titled Load Regulation, and 3,872,286 issued Mar. 18, 1975 to Richard E. J. Putman, and titled Control System and Method for Limiting Power Demand of An Industrial Plant.

Devices which perform the functions outlined above are generally referred to in the power industry as power demand monitors and limiters. With the ever-increasing cost of electrical power, manufacturers have begun to make use of power demand monitors and limiters in considerable numbers. However, certain problems attend the use of such devices. For example, many manufacturers who are concerned with maintaining their maximum power demands within acceptable limits conduct operations such as welding and machining in their factories. Such operations, if interrupted, can ruin expensive machine tools, damage the work in process, and make welds unacceptable in expensive work pieces. But, it is the nature of power demand monitors and limiters that they interrupt operations with little or no warning in a factory or in a particular portion of a factory, should the power demand of the whole factory approach a predetermined maximum limit.

Accordingly, it is an object of the present invention to provide apparatus which interacts with power demand monitors and limiters to prevent such power demand monitors and limiters from capriciously interrupting the flow of power to loads having defined operating cycles, such as machine tools and electric welders. The apparatus intercedes between such loads and the power demand monitors and limiters to prevent the power demand monitors and limiters from interrupting the flow of power to such loads until the operating cycles of such loads are completed.

In accordance with the invention, a system for controlling the supply of power to a selected one of a number of cyclical, separately controllable loads includes a controllable power supply switch for opening a power supply circuit to the said one of the loads, and a power demand monitor and limiter for sensing the amount of power being consumed by the number of loads and for generating a first "shed" signal to indicate that the supply of power to the said selected load is to be interrupted. The apparatus further includes means for sensing the completion of an operating cycle of the said selected load and for generating a signal in response to the completion of the operating cycle. A load gate coupled to the sensing means, the power demand monitor and limiter and the power supply switch allows the power demand monitor and limiter to pass its "shed" signal to the controllable power supply switch, causing the monitor and limiter to interrupt the power supply to the said selected load, only when a signal indicating the completion of an operating cycle has been received from the sensing means.

In accordance with one embodiment of the invention, the sensing means comprises a load cycle switch which switches upon completion of the operating cycle of the load. In accordance with another embodiment of the present invention, the load comprises an electric welding rod and work piece and the sensing means includes a current transformer coupled to the load to produce a signal indicative of the termination of the operating cycle of the load.

Further in accordance with the present invention, second means are included for sensing the time during which power is not being consumed productively in such a load. This timing means generates a signal after a predetermined time of inactivity. The load gate is responsive to this "time out" signal to open the controllable power supply switch to interrupt the power supply to the load.

Additional objects of the present invention will appear to those skilled in the art to which the invention pertains by referring to the following description and accompanying drawings of illustrative embodiments of the present invention. In those drawings:

FIG. 3a is a schematic diagram of another embodiment of a portion of the circuit of FIG. 3;

FIG. 3b is a partly block and partly schematic diagram of another embodiment of a portion of the circuit of FIG. 3;

FIG. 4 is a partly block and a partly schematic diagram of another circuit according to the present invention.

Figure 1:
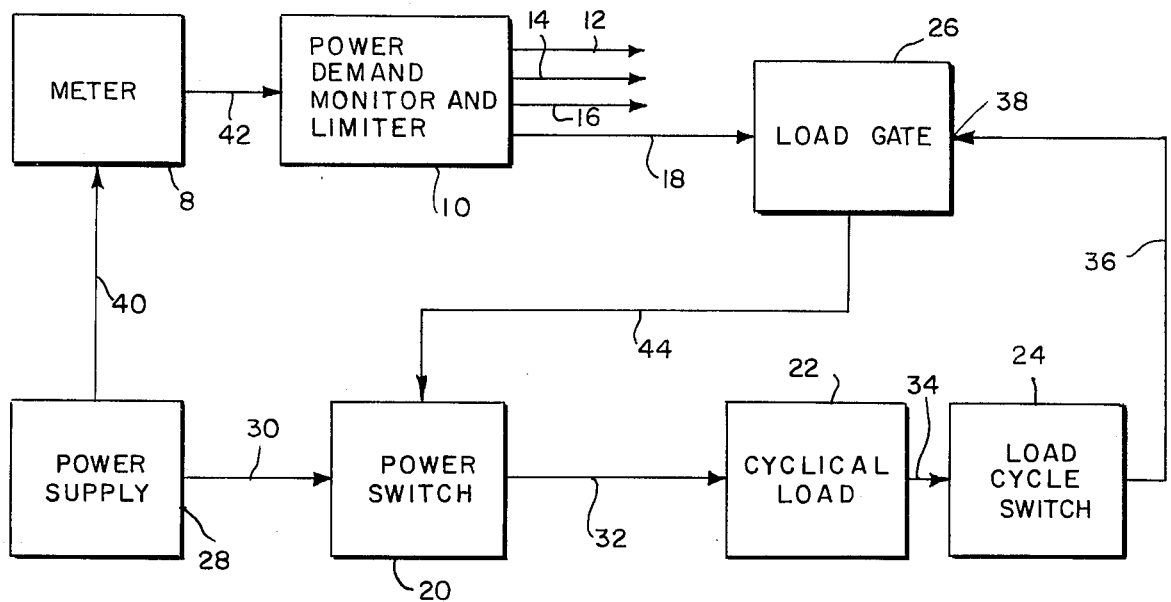
FIG. 1 is a block diagram of a system employing the apparatus of the present invention.

In a block diagram of a first embodiment of the invention illustrated in FIG. 1, signals indicative of power consumption from a supply 28 by the plurality of loads are supplied from a meter 8 to a power demand monitor and limiter 10. Power demand monitor and limiter 10 has a number of output channels, illustratively four, although the number of channels may be greater or less depending upon the particular application in which the power demand monitor and limiter 10 is being used. It is the function of the power demand monitor and limiter 10 to energize and de-energize the various loads which are coupled to its various channels to insure that the amount of power being consumed by the total number of energized loads does not exceed a predetermined maximum limit. Any one of the illustrative channels 12, 14, 16, 18 could be coupled directly to a controllable power supply switch (now shown) having two states. Such a power switch could be coupled between the power supply and a load, and power demand monitor and limiter 10 opening the controllable power supply switch to interrupt the supply of power to the load, thereby to de-energize the load on a signal from the power demand monitor and limiter 10. However, the channel 18 in FIG. 1 has been chosen to illustrate the present invention which is particularly useful in the situations in which a power demand monitor and limiter 10 is to control the supply of power through a controllable power switch 20 to a load 22 which is cyclical in nature.

By cyclical, it is meant that the load 22 performs a process with a defined start and end in a repetitive manner or an operating cycle. For example, if it is assumed that load 22 is a drill press motor, then a load cycle would be completed each time the press completed a drilling stroke into a work piece (not shown). Further to illustrate, if it is assumed that the load is an electric welding apparatus, a load cycle would be completed each time the welding apparatus completed a weld and the welding rod (not shown) was removed from contact with the work piece being welded.

It is important to recognize that, due to the possibility of ruining a work piece by interrupting load 22 during its operating cycle, a cycle of the load must be completed, even though a "shed" command has been generated by power demand monitor and limiter 10. Such a "shed" command, indicating that load 22 is to be removed from a power supply, must not be capriciously executed, but rather, must be executed only when load 22 is not performing an operating cycle. This insures that the work piece upon which the operation is being performed is not affected detrimentally by interruption.

Such a cyclical load 22 is coupled to a load cycle switch 24 which switches to indicate the termination of the cycle of load 22. The signals from the load cycle switch 24 are coupled to a load gate 26. Load gate 26 is coupled to power demand monitor and limiter 10 to receive and process the "interrupt" or "shed" signals generated to control controllable power switch 20. Load gate 26 processes these shed signals and ultimately provides such signals to controllable power switch 20 to interrupt the supply of power to cyclical load 22 only after load gate 26 has received an indication from load cycle switch 24 that load 22 has completed an operating cycle.

Power is supplied from a main supply 28 through one or more lines 30 and controllable double pole-double throw power switch 20 and one or more lines 32 to the cyclical load 22. Signals regarding the initiation and termination of each operating cycle of load 22 are coupled through a line 34 to the load cycle switch 24 which typically is mounted on, or in the vicinity of, load 22. The load cycle switch 24 is in a first state during the operating cycle of load 22 and in a second state from the termination of the operating cycle of load 22 until the initiation of the next succeeding cycle. Load cycle switch 24 is coupled through one or more lines 36 to an input channel 38 of load gate 26.

The amount of total power being supplied from supply 28 to a number of loads within, for example, an entire manufacturing facility, is monitored by a meter 8. Signals coupled through one or more lines 42 from meter 8 to power demand monitor and limiter 10 indicate that, in order to keep power consumption from supply 28 within maximum acceptable limits, one or more of the loads coupled to channels 12-18 must be shed. Typically, the power demand monitor and limiter 10 is pre-programmed to determine the desirable order in which the loads coupled to channels 12-18 should be shed. Assuming for purposes of illustration that power demand monitor and limiter 10 has determined that load 22 is to be shed, signals are produced on channel 18, which signals are coupled to the other input channel to load gate 26. Load gate 26 delays the shed command on its output channel 44 to controllable power switch 20 until the load gate has received signals from load cycle switch 24 on input channel 38 indicating that the operating cycle of load 22 is completed.

Figure 2:
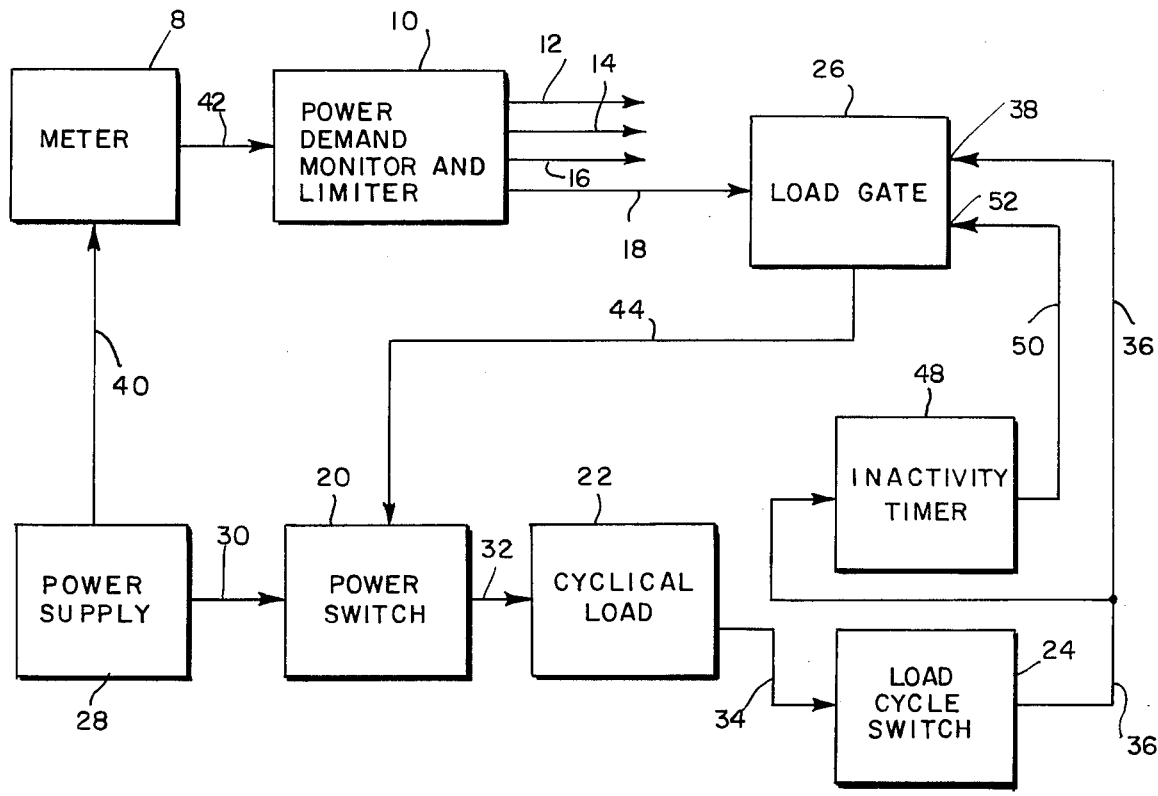
FIG. 2 is a block diagram of another system employing the inventive apparatus.

In a second embodiment of the invention, illustrated diagrammatically in FIG. 2, as well as in succeeding Figs., reference numerals identical to those used in the discussion of FIG. 1 refer to elements performing the same or similar functions. It is frequently desirable to open the controllable power switch 20 after the load 22 has been inactive for a predetermined amount of time. To perform this additional function, a signal indicative of the inactivity of load 22 is supplied through cycle switch 24 and channel 36 to an inactivity timer 48. One or more lines 50 supply a signal indicative of the passage of such a predetermined period of inactivity to an input channel 52 of load gate 26. The detection of such an inactivity signal in channel 52 causes load gate 26 to produce an output signal on channel 44 which causes power switch 20 to interrupt the supply of power to load 22.

There have been omitted from FIGS. 1-2 the additional lines which may be necessary to supply power to, for example, power demand monitor and limiter 10, load gate 26, power switch 20, and load cycle switch 24. It is to be understood that such lines may be required to practice a particular embodiment of the present invention, even though such lines have been omitted from FIGS. 1-2 for purposes of clarity.

Figure 3:
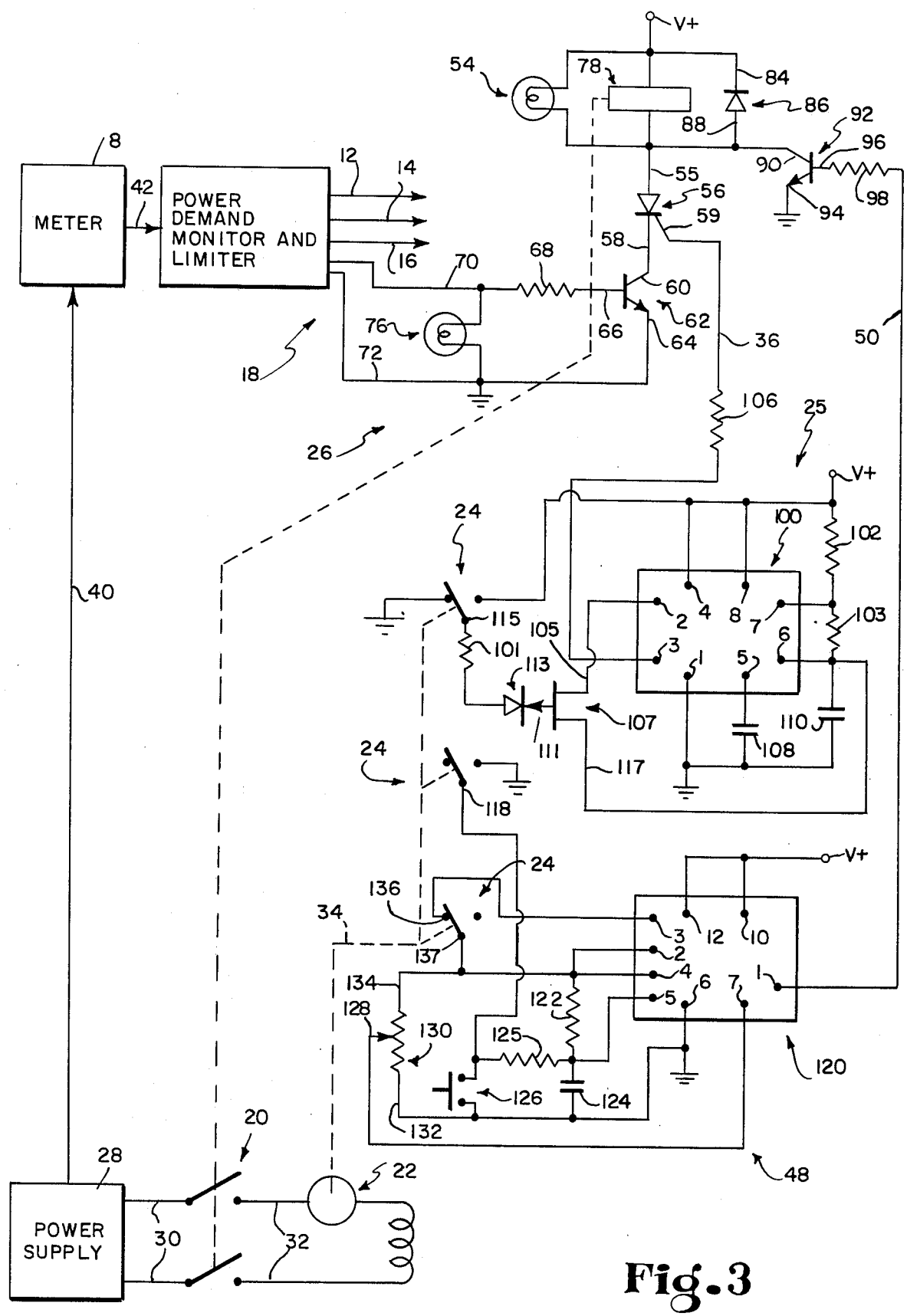
FIG. 3 is a partly block and partly schematic diagram of a circuit according to the present invention.

In an embodiment of the invention illustrated in FIG. 3, load gate 26 is illustrated schematically. Load cycle switch 24 is coupled to a multivibrator circuit 25, illustrated in partly block and partly schematic form. Inactivity timer 48 is illustrated in partly block and partly schematic form. The apparatus of FIG. 3 is for use with power demand monitors and limiters 10 of the type which operate from a low voltage, direct current source, nominally 24 VDC, and which produce shed signals on their output channels 12-18 which are also low voltage, direct current, nominally 24 VDC. Power switch 20 is a relay-actuated, double pole-double throw switch. The illustrated load 22 is a single-phase AC motor, such as might be used in a machining operation. Of course, for such a load to consume a significant amount of power, so that shedding it would have an appreciable effect on total power consumption, the motor would have to be rather large. However, this load is presented merely for illustrative purposes.

The load gate 26 is supplied with low voltage, direct current to a terminal V+ thereof. This voltage may be on the order to 15 VDC. The V+ terminal is coupled to one terminal of a lamp 54, the remaining terminal of which is coupled to the anode of a silicon controlled rectified (SCR) 56. The cathode of SCR 56, at terminal 58 is coupled to the collector 60 of a transistor 62. The emitter 64 of transistor 62 is coupled to ground. The base 66 of transistor 62 is coupled through a current-limiting resistor 68 to the positive lead 70 of channel 18. The channel 18 negative lead 72 is coupled to ground. The positive lead 70 of channel 18 is also coupled to one terminal of a lamp 76, the remaining terminal of which is coupled to ground.

A relay 78 is also coupled between the anode 55 of SCR 56 and voltage supply terminal V+. Relay 78 actuates, either directly or through a larger capacity contactor relay (not shown), the throws of switch 20 (the coupling being illustrated in FIG. 3 by broken line 44) to control switch 20. The cathode 84 of a damper diode 86 is also coupled to supply terminal V+. The anode 88 of diode 86 is coupled to the anode 55 of SCR 56. The anode 55 of SCR 56 is also coupled to the collector 90 of a transistor 92. The emitter 94 of transistor 92 is coupled to ground, and the base 96 of transistor 92 is coupled through a current limiting resistor 98 to channel 50.

Load cycle switch 24 is coupled to a conventional integrated circuit multivibrator such as, for example, the SIGNETICS, INC., NE555 integrated circuit. The integrated circuit is assigned the reference numeral 100. The numeral markings 1-8 on integrated circuit 100 illustrate the various desirable connections of integrated circuit 100 to load cycle switch 24 and to load gate 26. Pins 4, 8 of circuit 100 are coupled directly to a low voltage, direct current supply terminal V+. Pin 7 of circuit 100 is coupled to supply terminal V+ through a resistor 102. Pin 6 is connected to pin 7 through a resistor 103. Pin 2 of circuit 100 is coupled to the drain terminal 105 of a junction-type P-channel field-effect transistor (FET) 107. Pin 3 is coupled to channel 36 through a resistor 106. Pin 1 is coupled to ground. Pin 5 is coupled to ground through a capacitor 108. Pin 6 is coupled to ground through a capacitor 110. Pin 6 is also coupled directly to the source 117 of FET 107. The gate 111 of transistor 107 is coupled to the cathode of a diode 113 whose anode is coupled through a resistor 101 to a terminal 115 of a triple pole-double through load cycle switch 24. Switch 24 is connected to load 22 (illustrated diagrammatically in FIG. 3 by broken line 34) so that terminal 115 is coupled to ground when 22 completes an operating cycle. During the load 22 operating cycle, the terminal 115 of switch 24 is coupled to V+.

The inactivity timer 48 of the circuit of FIG. 3 includes a conventional integrated circuit 120, illustrated in block form. This circuit is of the type such as the NATIONAL SEMICONDUCTOR, INC. LM322 integrated circuit. When such chip is used, the numerals within block 120 illustrate the desirable external connection to integrated circuit 120. Pins 10, 12 of circuit 120 are coupled to the low voltage, direct current supply terminal V+. Pin 1 of circuit 120 is connected to channel 50. Pin 6 of circuit 120 is coupled to ground. Pins 2, 4 are coupled to one another and through a resistor 122 to pin 5. Pin 5 is coupled through a capacitor 124 to ground. A resistor 125 couples a push-to-discharge switch 126 across capacitor 124. Pin 7 of integrated circuit 120 is coupled to the wiper 128 of a potentiometer 130. The remaining two terminals 132, 134 of potentiometer 130 are coupled to ground and to a terminal 137, respectively, of switch 24. Terminal 134 of potentiometer 130 is also coupled to pin 2 of integrated circuit 120. Pin 3 of circuit 120 is coupled to a terminal 136 of switch 24. Terminal 118 of switch 24 is connected to a terminal 139 of switch 126.

In the operation of the circuits illustrated in FIG. 3, let us first assume that leads 70, 72 of channel 18 from the power demand monitor and limiter 10 are both at the same potential, i.e., ground. Leads 70, 72 are both at this potential when no shed command is being generated by power demand monitor and limiter 10. Controllable power switch 20 is closed and load 22 is executing an operating cycle. At the termination of this operating cycle, load 22 controls switch 24 (the controlling function being illustrated diagrammatically by broken line 34) to ground terminal 115 of load cycle switch 24. Pin 2 of integrated circuit 100 is thereby connected through FET 107 to pin 6. The connection of pin 2 to pin 6 of circuit 100 allows capacitor 110, which is coupled between pin 6 and ground, to begin to charge through resistors 102 and 103. This causes pin 3 to be switched to the potential coupled to terminal V+ and then to oscillate between V+ potential and ground potential. SCR 56 is placed in condition for conduction from its anode 55 to its cathode 58 each time positive potential appears on pin 3, the positive potential being coupled through resistor 106 and channel 36 to the gate electrode 59 thereof. However, since lead 70 is at ground potential, transistor 62 remains in the non-conductive state and thus no current flows in SCR 56. Relay 78 draws no current and switch 20 remains closed. Power continues to be available for load 22, so that the load may begin its next operating cycle.

Let it now be assumed, however, that lead 70 of the power demand monitor and limiter 10 is switched to a positive potential with respect to lead 72. This condition occurs when the power demand monitor and limiter 10 is issuing a shed command through channel 18 to load gate 26. The positive potential on lead 70 lights lamp 76 providing an indication to the operator of load 22 that a shed command has been received and that, at the end of the current operating cycle of load 22, the load will be removed from the power supply 28 by opening power switch 20. The positive potential on lead 70 also causes current to flow through resistor 68 and the base 66 of transistor 62. Transistor 62 thereby becomes conductive.

As the operating cycle of load 22 continues, switch 24 remains in its position as illustrated in FIG. 3. Thus, terminal 115 remains connected to V+ which keeps FET 107 off. However, when the operating cycle of load 22 is completed, terminal 115 is grounded, causing FET 107 to conduct and connect pins 2 and 6 of integrated circuit 100. This condition causes pin 3 to oscillate between V+ potential and ground potential. The V+ potential, coupled through resistor 106 and channel 36 to the gate electrode 59 of SCR 56 causes the SCR to become conductive. Current is conducted through SCR 56 and transistor 62 to ground, causing lamp 54 to light and relay 78 to open power switch 20.

The lighting of lamp 54 indicates that the shed command has been executed by load gate 26. SCR 56 will remain conductive until transistor 62 becomes non-conductive. This, of course, will only occur when lead 70 returns to approximately the same potential as lead 72. Power demand monitor and limiter 10 will only allow lead 70 to return to the lead 72 potential, i.e, ground, e.g., when the power consumed from supply 28 drops to a certain acceptable level.

Inactivity timer 48 is initiated by removing terminal 118 of switch 24 from ground potential at the end of each cycle of load 22. Removal of ground potential from terminal 118 allows capacitor 124 to charge through resistor 122 from the potential at pins 2 and 4. When terminals 136 and 137 of switch 24 are coupled together, pins 3 and 4 are at the same potential. If capacitor 124 is allowed to charge to a certain threshold voltage between pin 5 of circuit 120 and ground, an internal comparator of circuit 120 switches, causing pin 1 of circuit 120 to go to V+ potential. The V+ potential on pin 1 causes current to flow through channel 50 and resistor 98 to render transistor 92 conductive. Conduction of transistor 92 has the same effect upon relay 78 as conduction by SCR 56 and transistor 62, i.e., current flows from the V+ terminal through relay 78, collector 90 and emitter 94 of transistor 92, opening switch 20.

The time period of inactivity required before switch 20 is opened by conduction of transistor 92 depends upon the setting of an internal voltage comparator in circuit 120. That setting is controlled by the resistance between wiper 128 and terminal 132 of potentiometer 130. By adjusting wiper 128, inactivity timer 48 can be set to a desired time.

If load 22 begins its next operating cycle before capacitor 124 charges to sufficient potential to render transistor 92 conductive, the capacitor 124 will discharge through resistor 125 to the ground potential appearing at terminal 118 of switch 24 while load 22 executes its operating cycle. However, when inactivity timer 48 "times out", turning on transistor 92, switch 126 must be actuated to discharge capacitor 124 and return pin 1 to ground. When pin 1 goes to ground, transistor 92 becomes non-conductive, reconnecting load 22 to the power supply.

Another conventional type of power demand monitor and limiter 10 impresses 110 volt alternating current directly upon an output channel when a load coupled to such channel is to be shed. FIG. 3a illustrates an alternative embodiment of a portion of the circuit illustrated in FIG. 3 which will accommodate such 110 VAC shed signals on channel 18. In this embodiment, the incandescent lamp 76 of the embodiment of FIG. 3 is replaced by a higher voltage gas discharge lamp, e.g., a neon lamp 140, and a limiting resistor 142 serially coupled between lead 70 and ground. A rectifying diode 144 and filter capacitor 146 are also coupled between lead 70 and ground, with the anode 148 of rectifier diode 144 coupled to lead 70 and the cathode 150 of diode 144 coupled to the ungrounded terminal of capacitor 146. Diode 144 passes the positive-going voltage variations on lead 70 and stores this positive voltage in capacitor 146. This voltage discharges through current limiting resistor 68 and the base-emitter junction of transistor 62 rendering transistor 62 conductive. SCR 56 (see FIG. 3), the cathode 58 of which is coupled to the collector 60 of transistor 62, can thus become conductive whenever the gate electrode 59 thereof become sufficiently positive, i.e., at the end of the next operating cycle of load 22.

The device which senses the completion of a cycle of load 22 need not be a switch. For example, assuming that the cyclical load is a welder, it is frequently as simple to sense the current flow through welding conductor 154 as to provide a load cycle switch 24 on the load. The apparatus at FIG. 3b is presented as another means for sensing the completion of an operating cycle by such a load.

The load 22 illustrated in FIG. 3b is a welding apparatus. Current flows through a conductor 154 and a welding rod 156 to a weld 160 on a work piece 158. The circuit is completed by a conductor 162. Current flowing in conductor 154 is sensed by a transformer winding 164. If welder 22 is a direct current welder, transformer winding 164 should be located between the alternating current output conductor 154 and a rectifier 165 which makes the welder output current a direct current. One terminal 166 of winding 164 is coupled to ground. The remaining terminal 170 of winding 164 is coupled through a current-limiting resistor 174 to the cathode of a Zener diode 178. The anode of Zener diode 178 is grounded. The anode 182 of a rectifying diode 186 is coupled to the cathode of Zener diode 178. A storage capacitor 194 is coupled between the cathode 190 of diode 186 and ground. Cathode 190 is also coupled to a solid state switching network 200.

Network 200 replaces the triple pole-double throw switch 24 of FIG. 3. Accordingly, terminals 115, 118, 134, 136 of network 200 are analogous to the correspondingly numbered terminals of the switch of FIG. 3. Network 200 comprises transistors 202 and 204, the bases 208 and 210 of which are coupled to cathode 190 through isolation resistors 195, 196, respectively. The emitter 214 of transistor 202 is grounded. The emitter 218 of transistor 204 is coupled directly to terminal 134 of FIG. 3. The collectors 220, 222 of transistors 202, 204, respectively, are coupled directly to terminals 118, 136, respectively, of FIG. 3. Terminal 115 of the circuit of FIG. 3 is coupled directly to cathode 190.

In operation, as current is drawn through conductor 154 and welding rod 156, voltage variations at terminal 170 are supplied through resistor 174 and limited in amplitude by Zener diode 178. The limited voltage variations are rectified by diode 186, and the positive voltage appearing at cathode 190 appears across capacitor 194. This voltage is supplied through resistors 195 and 196 to the bases 208 and 210 of transistors 202 and 204, and through resistor 101 and diode 105 to the gate of FET 107. Transistor 202 is placed in a highly conductive state, thereby placing its collector 220 at approximately ground potential. The positive potential at the base 210 of transistor 204 causes that transistor to remain non-conductive. Thus, as long as such positive voltage appears across capacitor 194, terminal 118 remains grounded in the apparatus of FIG. 3b, just as it was during the operating cycle of the apparatus of FIG. 3. Similarly, terminals 134 and 136 remain isolated from one another as in the apparatus of FIG. 3. Terminal 115 is positive, turning off FET 107 as in the apparatus of FIG. 3.

When current ceases to flow in conductor 154, i.e., when the welder 22 has completed an operating cycle, such that relatively high positive voltage no longer is supplied to cathode 190, transistor 202 is switched from its highly conductive state. Removal of voltage from terminal 115 causes FET 107 to become conductive connecting pins 2 and 6 of circuit 100 and causing pin 3 of circuit 100 to oscillate between positive voltage V+ and ground potential as previously described. Similarly, removal of the positive potential from base 210 of transistor 204 causes that PNP transistor to become highly conductive, thereby placing terminals 134 and 136 at approximately the same potential. This condition, with terminal 115 at ground, terminals 134 and 136 at approximately equal potentials, and terminal 118 isolated from ground, duplicates the conditions at those terminals in switch 24 of FIG. 3 when the load 22 of that Figure is inactive.

Figure 3C:
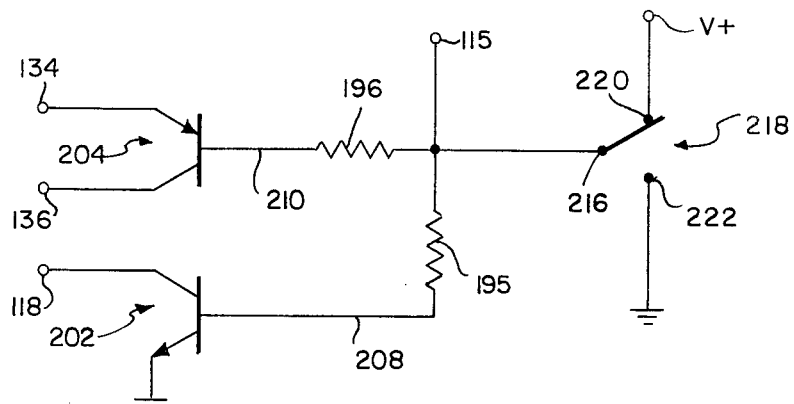
FIG. 3c is a schematic diagram of another embodiment of a portion of the circuit of FIG. 3.

The solid state switching network 200 of FIG. 3b can be coupled to a single pole-double throw switch which will perform the function of load cycle switch 24' illustrated in FIG. 3b. In the embodiment of the invention illustrated in FIG. 3c, bases 208, 210 of transistors 202, 204, respectively, are coupled through resistors 195, 196, respectively, to a terminal 216 of a switch 218. A terminal 220 of switch 218 is coupled to the V+ potential supply. A terminal 222 of switch 218 is coupled to ground. When switch 218 is thrown to connect terminal 216 to terminal 220, transistor 204 will be non-conductive and transistor 202 will be conductive. When switch 218 is thrown to connect terminal 222 to terminal 216, transistor 204 will be conductive and transistor 202 will be non-conductive. Terminal 115 of FIG. 3 is also connected to terminal 216. It may be seen that this embodiment also replaces the triple pole-double throw switch 24 of FIG. 3.

In many power demand monitors and limiters, the shed command appearing in an output channel, e.g., channel 18 of FIGS. 1–3, is a negative-going signal. That is, the output signal on such channel 18 will go from 110 VAC or 24 VDC in the normal mode to ground potential when the shed command is generated. Accordingly, the embodiments of FIGS. 3d–e are presented.

Figure 3D:
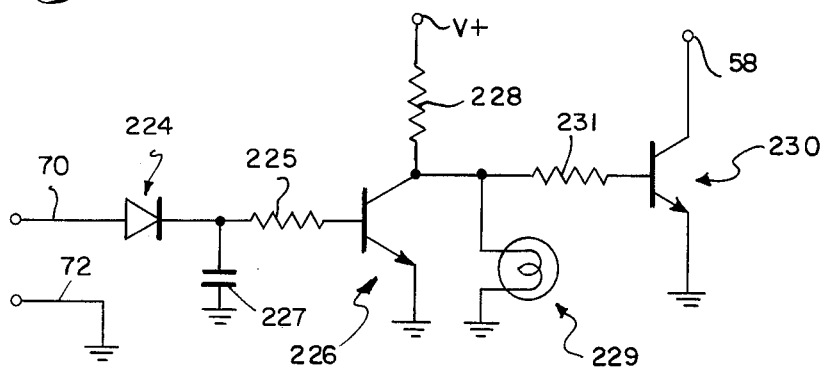
FIG. 3d is a schematic diagram of another embodiment of a portion of the circuit of FIG. 3.

In the embodiment of FIG. 3d, suitable for use with shed command signals which go to ground potential from 110 VAC, line 70 is coupled to the anode of a rectifying diode 224. The cathode of diode 224 is coupled through a current-limiting resistor 225 to the base of an inverting transistor 226. The cathode of diode 224 is also coupled to one terminal of a storage capacitor 227. The remaining terminal of capacitor 227 is coupled to ground. The emitter of transistor 226 is coupled to ground. The collector of transistor 226 is coupled through a resistor 228 to V+ potential. An indicator lamp 229 is coupled between the collector of transistor 226 and ground. A resistor 231 is coupled between the collector of transistor 226 and the base of a transistor 230. The emitter of transistor 230 is coupled to ground. The collector of transistor 230 is coupled to the cathode 58 of SCR 56 of FIG. 3. This triggering circuit replaces the transistor 62 triggering circuit in load gate 26 of FIG. 3. The circuit of FIG. 3d operates in a similar manner to the circuit of FIG. 3a, with the exception that the inverting transistor 226 is added. Transistor 226 is necessary since this circuit is to render transistor 230 conductive on shed commands which go from 110 VAC to ground potential.

Figure 3E:
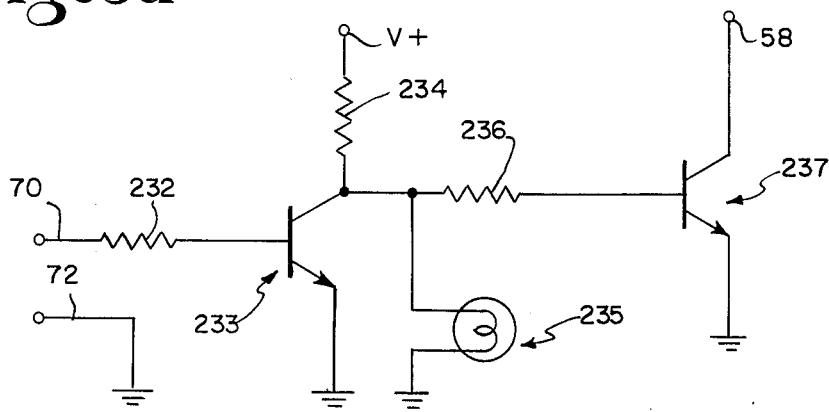
FIG. 3e is a schematic diagram of another embodiment of a portion of the circuit of FIG. 3.

The circuit of FIG. 3e is useful with power demand monitors and limiters which produce 24 VDC-to-ground potential shed commands. Line 70 of FIG. 3 is coupled through a resistor 232 to the base of an inverting transistor 233. The emitter of transistor 233 is grounded, and the collector of transistor 233 is coupled through a resistor 234 to V+ potential. An indicator lamp 235 is coupled between the collector of transistor 233 and ground. A resistor 236 is coupled between the collector of transistor 233 and the base of a transistor 237. The emitter of transistor 237 is grounded. The collector of transistor 237 is coupled to the cathode 58 of SCR 56 of FIG. 3. This circuit functions in a manner similar to the transistor 62 trigger circuit of FIG. 3.

Again, however, since the circuit of FIG. 3e is to render transistor 237 conductive on a 24 VDC-to-ground potential shed command, inverting transistor 233 is required.

In certain applications, e.g., when a power demand monitor and limiter 10 which operates from 110 VAC is used, it is desirable to have a load gate 26 which also operates from a 110 VAC source. Accordingly, the embodiment of FIG. 4 is presented. 110 VAC power is supplied to terminals 240, 242. Where a load cycle switch 24 and an inactivity timer 48 similar to those discussed in connection with the diagram of FIG. 3 are used, it is necessary to provide low voltage, direct current power to such devices. Thus, the power supply 248 of FIG. 4 is provided to supply at an output terminal V+ thereof the necessary low voltage direct current to power load cycle switch 24 and inactivity timer 48. The power supply input terminals are coupled across terminals 240, 242.

In this embodiment, in order for the power demand monitor and limiter 10 to actuate relay 78 to open power switch 20, and light lamp 54 to indicate that the shed command has been executed, a triac 250 or a triac 252 must first be placed in a highly conductive state. Triacs 250, 252 are placed in highly conductive states, completing the circuit from terminal 240 through a relay 78 to terminal 242, by signals coupled to their gates 260, 268, respectively, from load cycle switch 24 and inactivity timer 48, respectively. In this embodiment, switch 254 works oppositely with a switch 258 which is controlled by load cycle switch 24. A shed command on channel 18 of this power demand monitor and limiter 10 is created by closing a circuit internally of the power demand monitor and limiter between leads 70 and 72 thereof so that leads 70, 72 are at equal potential.

When load 22 signals load cycle switch 24 through channel 34 that an operating cycle of load 22 has been completed, and power demand monitor and limiter 10 has issued a shed command (leads 70, 72 at approximately the same potential), load cycle switch 24 operates to open switch 254 and simultaneously to close switch 258. Load cycle switch 24 also produces a signal on the gate electrode 260 of triac 250 to allow alternating current to flow between terminals 262, 264 thereof. This alternating current, of course, flows through relay 78, causing it to open power switch 20. This current also lights lamp 54, indicating that a shed command has been executed.

When no shed command has been generated by power demand monitor and limiter 10, channel 18 will be opened internally of the power demand monitor and limiter so that leads 70, 72 will no longer be at equal potentials. Anode 264 will be at ground potential and triac 250 will remain non-conductive.

When load 22 completes an operating cycle, a signal is passed through channel 46 to inactivity timer 48. As before, inactivity timer 48 begins to time the inactivity of load 22 and, after a predetermined period of inactivity, inactivity timer 48 generates a signal at gate 268 of triac 252. This signal allows alternating current to flow between terminals 272 and 270 of triac 252, completing the alternating current circuit between terminals 240, 242 through relay 78 and lamp 54. Power switch 20 is thereby opened. Triac 252 will be rendered non-conductive again when switch 256 is closed, either manually or automatically, and electrodes 270, 272 reach the same potential.

What is claimed is:

1. Apparatus for controlling the supply of power to a selected load of a number of cyclical, separately controllable loads, comprising a controllable switch for opening the power supply circuit to the selected load, first means for sensing the amount of power being consumed by the loads and for generating a first signal to indicate that the supply of power to the selected load is to be interrupted, second means for sensing the completion of an operating cycle of the selected load and for generating a second signal in response thereto, and gate means for allowing the first sensing means to pass said first signal to cause said controllable switch to interrupt the power supply to the selected load only after the second signal has been generated, the first and second means and controllable switch being coupled to the gate means.

2. Apparatus according to claim 1 wherein the first sensing means comprises a power demand monitor and limiter, the second sensing means comprises a load cycle switch switchable to indicate the end of an operating cycle in the selected load, and the gate means comprises a load gate responsive to the switching of the load cycle switch to enable the power demand monitor and limiter to control the controllable power supply switch.

3. Apparatus according to claim 1 wherein the first sensing means comprises a power demand monitor and limiter, the load includes a conductor, the second sensing means comprises a current transformer winding for producing voltage variations indicative of the flow and termination of the flow of current through the conductor, and the gate means comprises a load gate for responding to voltage variations across the current transformer winding indicative of termination of the flow of current through the conductor to enable the power demand monitor and limiter to control the controllable power supply switch.

4. Apparatus according to claim 1 and further including third means for sensing the time during which power is not being consumed productively in the load and for generating a third signal after a predetermined time period of inactivity, the gate means further being responsive to the third signal to cause the controllable power supply switch to open the power supply circuit to the load.

5. In combination with a load, a power supply, a controllable power switch coupled to the supply and to the load, and a power demand monitor and limiter, a load gate for responding to the operating cycle of the load for inhibiting the opening of the controllable power switch upon the occurrence of a signal from the power demand monitor and limiter until the completion of the operating cycle in the load, means for coupling the load gate to the load, means for coupling the power demand monitor and limiter to the load gate and means for coupling the load gate to the power switch.

6. Apparatus according to claim 5 wherein the means for coupling the load gate to the load includes a load cycle switch for switching upon completion of an operating cycle, the load gate being responsive to the switching of the load cycle switch to allow signals from the power demand monitor and limiter to control operation of the power switch.

7. Apparatus according to claim 5 wherein the load comprises an electric welding apparatus and the means for coupling the load to the load gate comprises a current transformer for producing voltage variations in response to current flow in the load, the current transformer being coupled to the welding apparatus, and the load gate being responsive to termination of the voltage variations to allow signals from the power demand monitor and limiter to control operation of the controllable power switch.

8. Apparatus according to claim 5 and further comprising an inactivity timer for providing a signal to the load gate to open the controllable power switch to interrupt the power supply to the load when the load has been inactive for a predetermined amount of time, the inactivity timer being coupled to the load and to the load gate.

9. In an apparatus for controlling the supply of power to a selected load of a number of cyclical, separately controllable loads, the apparatus comprising a controllable switch for interrupting the power supply circuit to the selected load, and first means for sensing the amount of power being consumed by the number of loads and for generating a first signal to indicate that the supply of power to the selected load is to be interrupted, the improvement comprising second means for sensing the completion of an operating cycle of the selected load and for generating a second signal in response thereto, and gate means for allowing the first sensing means to pass the first signal to cause the controllable switch to interrupt the supply of power to the selected load only after the second signal has been generated.

10. In an apparatus for controlling the supply of power to one of a plurality of cyclical loads, the apparatus including a power supply, a controllable power switch for switching power supplied by the power supply to said one load and means for sensing power consumed by said plurality of loads and for generating a first signal for switching the controllable power switch to interrupt the supply of power to said one load, the improvement comprising means for sensing operation of said one load, for generating a second signal indicative of termination of an operating cycle in said one load and for inhibiting the control of the controllable power switch by the first signal until the second signal has been generated.

* * * * *